(12) United States Patent
Hsu

(10) Patent No.: US 12,429,154 B2
(45) Date of Patent: Sep. 30, 2025

(54) QUICK COUPLER ASSEMBLY

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/581,622

(22) Filed: Feb. 20, 2024

(65) Prior Publication Data

US 2025/0251072 A1 Aug. 7, 2025

(30) Foreign Application Priority Data

Feb. 1, 2024 (TW) .................................. 113104049

(51) Int. Cl.
*F16L 37/34* (2006.01)
*F16L 37/35* (2006.01)

(52) U.S. Cl.
CPC .............. *F16L 37/34* (2013.01); *F16L 37/35* (2013.01)

(58) Field of Classification Search
CPC .................................. F16L 37/35; F16L 37/34
See application file for complete search history.

(56) References Cited

U.S. PATENT DOCUMENTS

| | | | | |
|---|---|---|---|---|
| 2,457,251 A * | 12/1948 | Main, Jr. | ............... | F16L 37/34 137/614.04 |
| 3,120,968 A * | 2/1964 | Calvin | ............... | F16L 37/34 285/321 |
| 3,417,781 A * | 12/1968 | Gregg | ............... | F16L 37/34 137/614.04 |
| 3,613,726 A * | 10/1971 | Torres | ............... | F16L 37/23 285/86 |
| 3,645,294 A * | 2/1972 | Allread | ............... | F16L 37/34 137/614 |

(Continued)

FOREIGN PATENT DOCUMENTS

| CN | 110220058 A | * 9/2019 | ............ F16L 37/244 |
|---|---|---|---|
| CN | 114413094 A | 4/2022 | |

(Continued)

OTHER PUBLICATIONS

Search Report dated Aug. 9, 2024 issued by Taiwan Intellectual Property Office for counterpart application No. 113104049.

*Primary Examiner* — David Colon-Morales
(74) *Attorney, Agent, or Firm* — Demian K. Jackson; Jackson IPG PLLC

(57) ABSTRACT

A quick coupler assembly includes a male and a female coupler connected end to end. The male coupler includes a seat having a core pipe; and a sliding sleeve and a sleeve sequentially fitted around the core pipe. The female coupler includes a pipe member externally provided with a pipe sealing ring and internally provided with a movable valve head. The pipe member pushes the sliding sleeve backward when being connected to the sleeve of the male coupler, so that the pipe sealing ring and a sealing ring on the sliding sleeve form an outer side first seal mechanism in the sleeve of the male coupler. Meanwhile, the backward moved sliding sleeve allows a front end of the core pipe to enter into the pipe member, such that a front and a rear sealing ring on the core pipe form an inner side second seal mechanism in the sliding sleeve.

10 Claims, 13 Drawing Sheets

(56) References Cited

U.S. PATENT DOCUMENTS

| | | | | | |
|---|---|---|---|---|---|
| 4,086,939 | A | * | 5/1978 | Wilcox | F16L 37/34 251/149.6 |
| 4,815,495 | A | * | 3/1989 | Remsburg | F16L 37/23 251/126 |
| 5,211,197 | A | * | 5/1993 | Marrison | F16L 37/35 251/149.6 |
| 5,322,330 | A | * | 6/1994 | Remsburg | F16L 37/56 285/39 |
| 5,482,083 | A | * | 1/1996 | Jenski | F16L 37/35 285/307 |
| 5,546,985 | A | * | 8/1996 | Bartholomew | F16L 37/34 251/149.6 |
| 6,161,578 | A | * | 12/2000 | Braun | F16L 37/35 137/614.04 |
| 6,170,522 | B1 | * | 1/2001 | Tanida | F16L 39/00 137/614.04 |
| 6,681,803 | B2 | * | 1/2004 | Taneya | F16L 37/23 251/149.6 |
| 7,213,845 | B2 | * | 5/2007 | Sato | F16L 37/34 285/85 |
| 8,602,057 | B2 | * | 12/2013 | Abura | F16L 37/23 251/149.6 |
| 9,032,997 | B2 | * | 5/2015 | Abura | F16L 37/28 251/149.6 |
| 9,080,712 | B2 | * | 7/2015 | Tiberghien | F16L 37/23 |
| 9,708,173 | B2 | * | 7/2017 | Ballard | B67D 7/42 |
| 10,190,713 | B2 | * | 1/2019 | Tiberghien | F16L 37/32 |
| 10,253,911 | B1 | * | 4/2019 | Quang | F16L 37/123 |
| 11,040,868 | B2 | * | 6/2021 | Peattie | B67D 7/44 |
| 11,149,891 | B2 | * | 10/2021 | Tiberghien | F16L 37/40 |
| 11,428,359 | B2 | * | 8/2022 | Tiberghien | F16L 37/22 |
| 11,486,528 | B2 | * | 11/2022 | Nick | F16L 37/23 |
| 11,655,924 | B2 | * | 5/2023 | Ramaswamy | F16L 29/04 251/149.6 |
| 11,815,214 | B2 | * | 11/2023 | Nick | H05K 7/20781 |
| 11,873,934 | B2 | * | 1/2024 | Durieux | F16L 37/098 |
| 12,038,113 | B2 | * | 7/2024 | Truong | F16L 37/34 |
| 12,186,518 | B2 | * | 1/2025 | Gaffney | F16L 37/34 |
| 2012/0241021 | A1 | * | 9/2012 | Nick | F16L 29/04 137/614.06 |

FOREIGN PATENT DOCUMENTS

| | | | |
|---|---|---|---|
| TW | M658585 U | 8/2024 | |
| WO | WO-2012165391 A1 * | 12/2012 | F16L 37/34 |

\* cited by examiner

QUICK COUPLER ASSEMBLY

This application claims the priority benefit of Taiwan patent application number 113104049 filed on Feb. 1, 2024.

FIELD OF THE INVENTION

The present invention relates to the field of quick coupler assembly, and more particularly, to a quick coupler assembly that forms an outer side and an inner side seal mechanism before and after, respectively, a male and a female coupler of the assembly are communicably connected together, so as to effectively prevent medium in the quick coupler assembly from leaking out of there.

BACKGROUND OF THE INVENTION

A quick coupler is often used in liquid or gas conveyance. The currently available quick coupler assembly generally includes a male coupler and a female coupler, which are connected at two opposing rear ends to a pipe respectively and can be quickly connected or disconnected at two facing front ends. Usually, the female coupler is connected at its rear end to a fixed module while the male coupler has its rear end connected to a hose and its front end engaged with a plug end formed at the front end of the female coupler to enable quick connection or disconnection of pipes in a plumbing system.

An example of the prior art quick coupler is disclosed in FIG. 1, which includes a fixed core coupler valve 11 and a movable core coupler valve 12 for communicably connecting two corresponding pipes. The fixed core and movable core coupler valve 11, 12 are connected end to end at their respective front end, which serve as coupling ends. The fixed core coupler valve 11 includes a first valve body 111 and a first valve seat 112 mounted to a rear end of the first valve body 111. A fixed valve core 113 is fitted in the first valve body 111 and fixedly connected to the first valve seat 112. A sliding sleeve 115 is axially movably fitted on around the fixed valve core 113 to prevent the latter from moving forward and backward to separate from the first valve body 111. And, a first spring 116 is mounted between a rear end of the sliding sleeve 115 and the first valve seat 112. The movable core coupler valve 12 includes a second valve body 121 and a second valve seat 122 mounted to a rear end of the second valve body 121. The second valve body 121 internally defines a second passage 123 and has a movable valve core 124 axially movably mounted in the second passage 123. A second spring 125 is mounted between a rear end of the movable valve core 124 and the second valve seat 122. The movable valve core 124 has a front end engaged with a front end of the second valve body 121 in limiting fit to seal a front end of the second passage 123. In the course the fixed and the movable core coupler valve 11, 12 are connected with each other end to end, a pressing structure provided at the front end of the movable valve core 124 presses against and engages with the fixed valve core 113 to push the latter backward, so as to open the second passage 123. The fixed valve core 113 includes a valve core sealing section 117 and internally defines a first passage 118, which has a medium inlet 1181 located at a rear end of the fixed valve core 113 for receiving a medium from a corresponding pipe, and a medium outlet 1182 circumferentially located on the valve core sealing section 117. The sliding sleeve 115 has a sliding sleeve sealing section 1151, which is slidably to engage with the valve core sealing section 117 in sealing fit to thereby seal the medium outlet 1182. In the course the sliding sleeve 115 slides backward relative to the fixed valve core 113 to open the medium outlet 1182, the front end of the second valve body 121 can push the sliding sleeve 115 backward to open the medium outlet 1182 when the fixed and the movable core coupler valve 11, 12 are connected end to end, so as to communicate the first passage 118 with the second passage 123.

When the fixed and the movable core coupler valve 11, 12 axially face toward each other, the second valve body 121 of the movable core coupler valve 12 extends into the first valve body 111 of the fixed core coupler valve 11 to push against the first valve body 111; meanwhile, the movable valve core 124 of the movable core coupler valve 12 is pressed by the fixed valve core 113 to move backward, so that the fixed and the movable core coupler valve 11, 12 are connected to create a smoothly communicable internal passage for the medium to flow therethrough.

It is noted the pushing of the second valve body 121 to move the first valve body 111 backward and the pressing of the fixed valve core 113 to move the movable valve core 124 occur synchronously; and the medium in the fixed and the movable core coupler valve 11, 12 has started flowing when the movable valve core 124 is pressed by the fixed valve core 113 to move backward. As a result, the medium, such as water, tends to leak from the wall surface at the junction of the movable core coupler valve 12 and the fixed core coupler valve 11.

Further, the disclosure in FIG. 1 includes only one inner side seal mechanism. When the fixed and the movable core coupler valve 11, 12 are disconnected from each other, the medium (or fluid) left in the valve bodies would leak out because there is not other seal mechanism to stop the medium from leaking. Leakage of the medium would damage or even destroy electronic elements in an electronic device. Therefore, it is desirable to ensure the fixed and the movable core coupler valve 11, 12 are always fully sealed without leaking no matter when they are connected or disconnected to or from each other.

SUMMARY OF THE INVENTION

A primary object of the present invention is to provide a quick coupler assembly capable of overcoming the problem in the prior art quick coupler assembly.

To achieve the above and other objects, the quick coupler assembly according to the present invention includes a male and a female coupler being coupled together end to end. The male coupler includes a seat, a sleeve, a sliding sleeve, and a first return spring. The seat includes a core pipe being externally fitted around by the sliding sleeve and the first return spring, and the core pipe is provided on its circumferential outer surface with a front sealing ring and a rear sealing ring, such that a length of the core pipe located between the front and the rear sealing ring is defined as a core pipe sealing section. The core pipe internally defines a first passage, which forms a first opening at a rear end of the seat, and the core pipe sealing section is provided on its circumferential surface with at least one second opening. The sliding sleeve internally includes a sliding sleeve sealing section, which is slidably relative to and cooperates with the core pipe sealing section for closing the second opening and has a sliding sleeve sealing ring provided on its circumferential outer surface. And, the first return spring is located between the sliding sleeve and the seat.

The female coupler includes a main body internally defining a main body passage. The main body has a rear end provided with a connecting section that defines a third opening communicable with the main body passage, and a front end having a pipe member connected thereto. The pipe member is provided on its outer surface near the front end thereof with a pipe sealing ring, and is externally covered by a female coupler housing. The pipe member internally defines a second passage, which is communicable with the main body passage and forms a sealing opening at a front end of the pipe member. The second passage is internally provided with a movable valve head and a second return spring; the second return spring is located between the base and the movable valve head, and the movable valve head is provided on its circumferential outer surface with a valve head sealing section for connecting to the sealing opening in sealing fit.

The pipe member of the female coupler pushes the sliding sleeve of the male coupler backward when it is connected to the sleeve of the male coupler, such that the pipe sealing ring on the outer surface of the pipe member and the sliding sleeve sealing ring on the sliding sleeve together form an outer side first seal mechanism in the sleeve of the male coupler; meanwhile, the backward movement of the sleeve being pushed by the pipe member allows the front end of the core pipe of the male coupler to enter into the pipe member and push the movable valve head backward, and the front and the rear sealing ring on the seat of the male coupler respectively form an inner side second seal mechanism before and after the female and the male coupler are communicably connected together.

With the above described structure, it is able to form an outer and an inner side seal mechanism before and after the male and the female coupler are communicably connected together to prevent medium in the quick coupler assembly from leaking out of there.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof.

Figure 1:
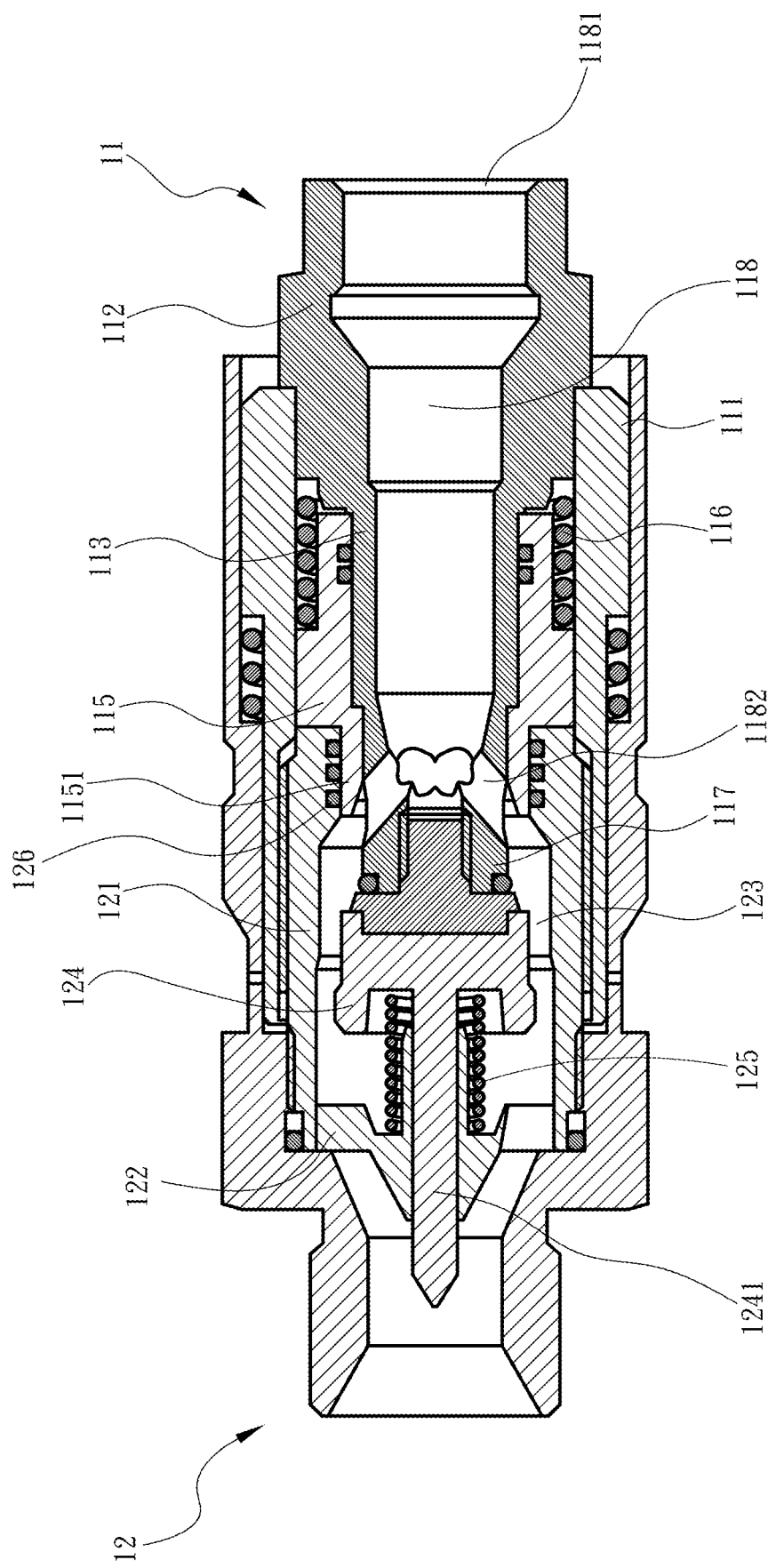
FIG. 1 is an assembled sectional view of a prior art quick coupler assembly.
Figure 2:
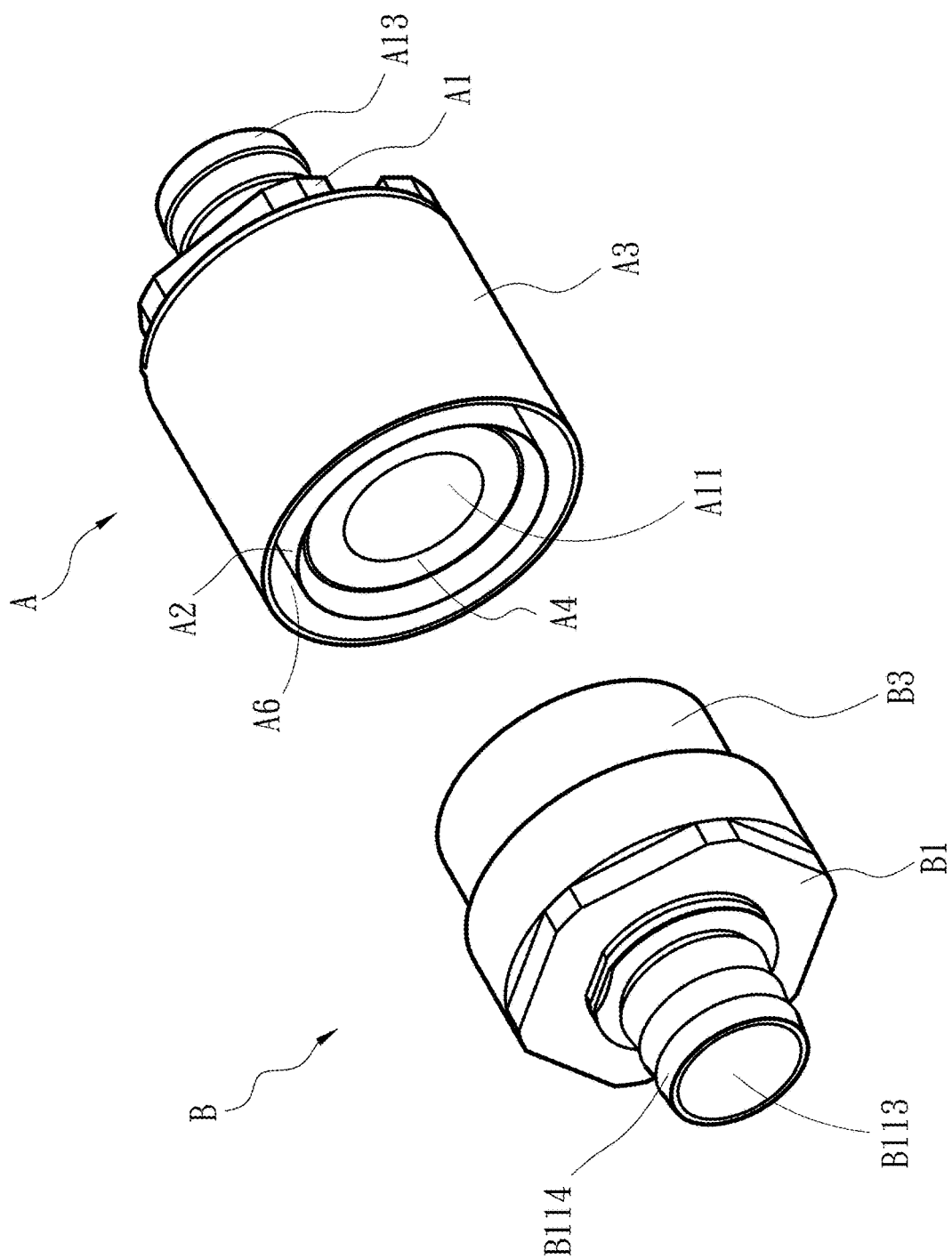
FIGS. 2 and 3 are perspective views of a male and a female coupler of a quick coupler assembly according to a preferred embodiment of the present invention in a separated and an assembled state, respectively.
Figure 3:
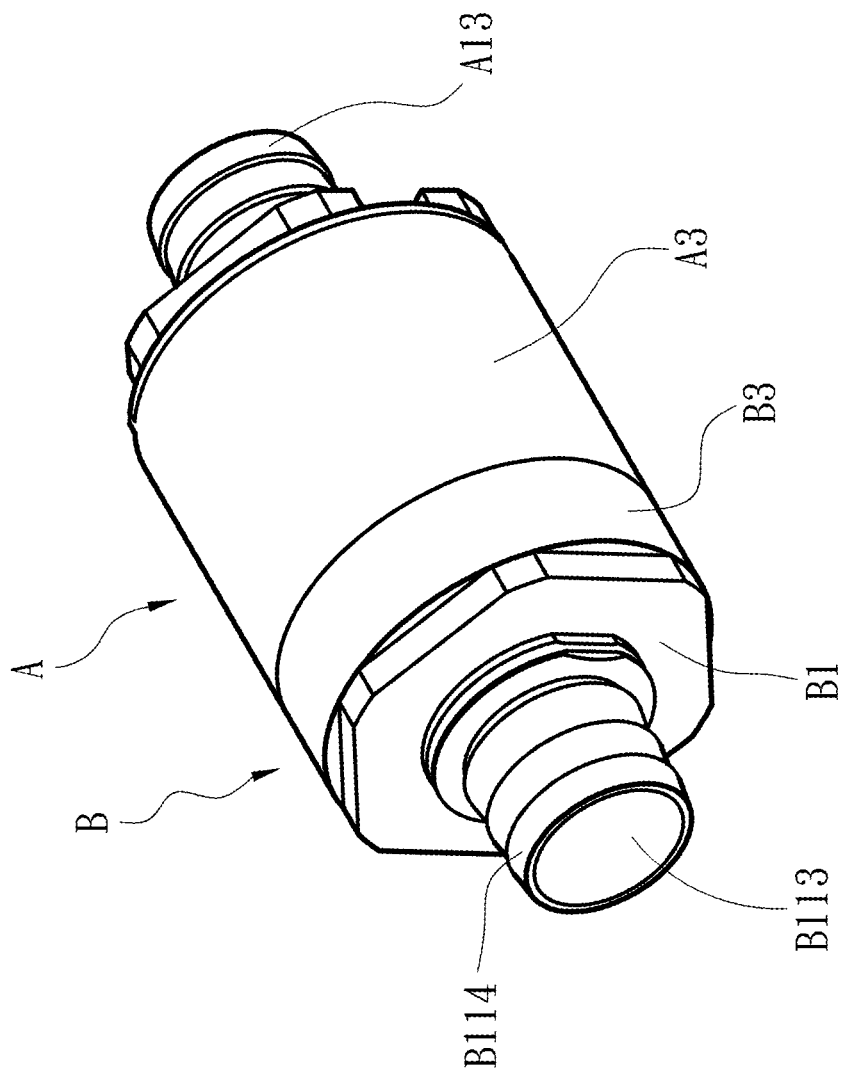

Please refer to FIGS. 2 and 3, which are perspective views of a male and a female coupler A, B of a quick coupler assembly according to a preferred embodiment of the present invention in a separated and an assembled state, respectively. The male coupler A and the female coupler B respectively have a front end, which face toward each other and are coupled together end to end. Meanwhile, the male and the female coupler A, B respectively have a rear end for connecting to an external unit, such as a pipe, a water tank, etc. The male and the female coupler A, B are in a sealed state when they are disconnected from each other; and are communicable with each other when they are coupled together end to end.

Figure 4:
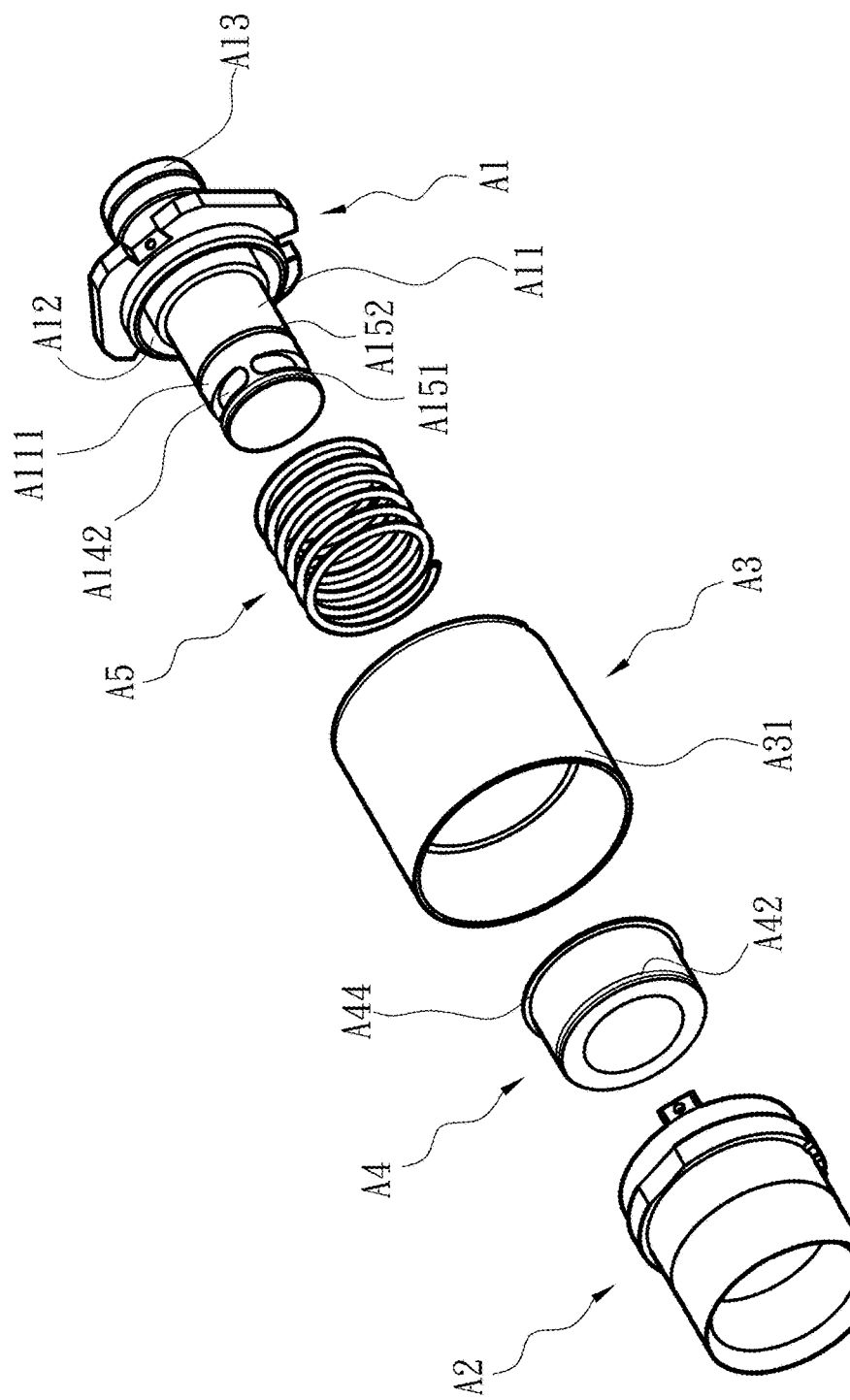
FIG. 4 is an exploded perspective view of the male coupler according to the preferred embodiment of the present invention.
Figure 5:
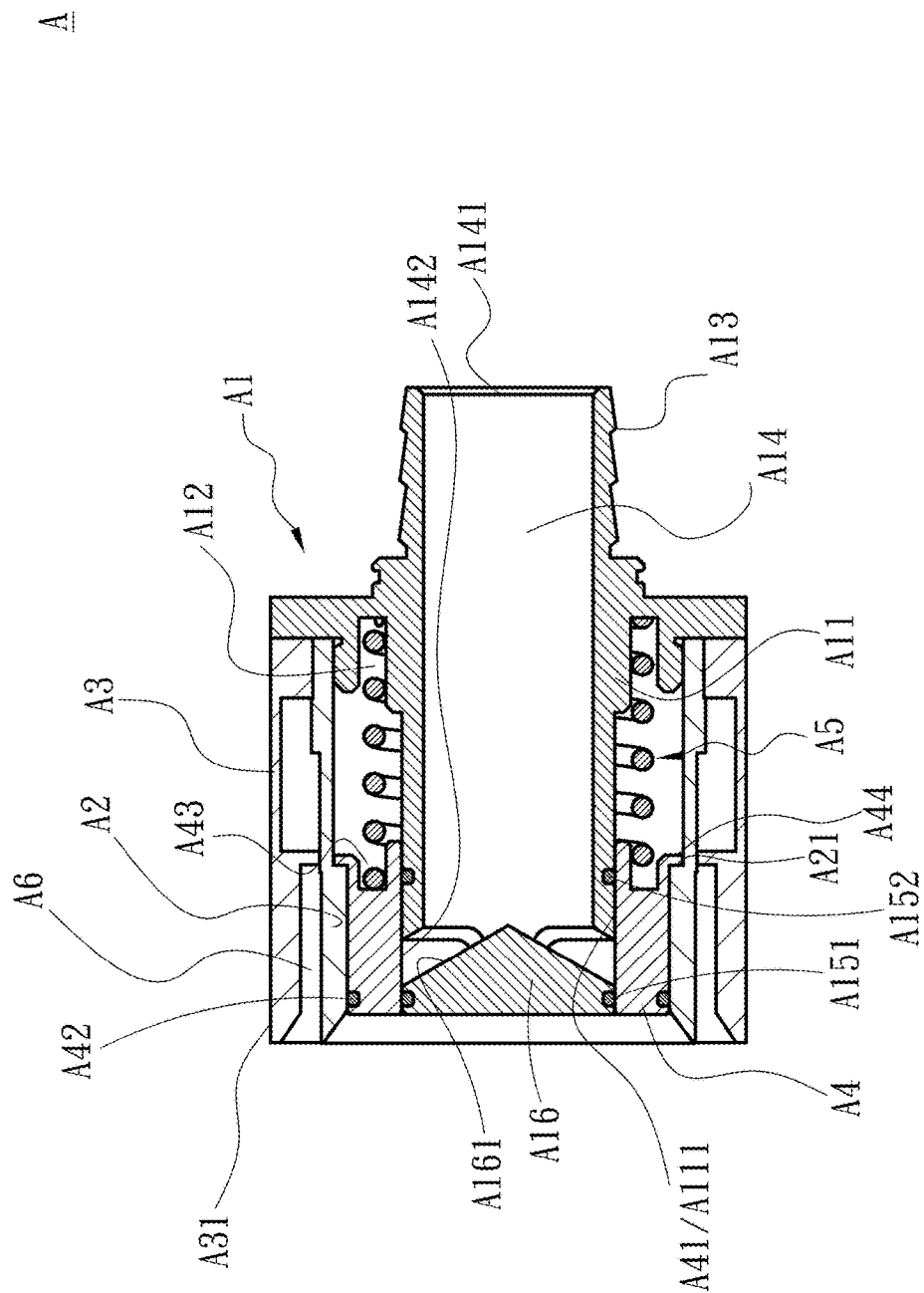
FIG. 5 is an assembled sectional side view of the male coupler of FIG. 4.

FIG. 4 is an exploded perspective view of the male coupler A and FIG. 5 is an assembled sectional side view of the male coupler A. Please refer to FIGS. 4 and 5 along with FIG. 2. As shown, the male coupler A includes a seat A1 having a core pipe A11. Portions of the core pipe A11 located in front of a front end and behind a rear end of the seat A1 are defined as a front part and a rear part, respectively. The front part of the core pipe A11 has a front seal ring A151 and a rear sealing ring A152 axially spaced thereon. A length of the core pipe A11 located between the front sealing ring A151 and the rear sealing ring A152 is defined as a core pipe sealing section A111; and the rear part of the core pipe A11 forms a connecting section A13 for connecting with an external unit.

The core pipe A11 internally defines a first passage A14, which extends rearward through the connecting section A13 to define a first opening A141. The core pipe sealing section A111 of the core pipe A11 has at least one second opening A142, which is formed on a circumferential surface of the core pipe sealing section A111 located between the front sealing ring A151 and the rear sealing ring A152. A conical protrusion A16 is provided in the first passage A14 and located adjacent to a front end of the core pipe A11. The conical protrusion A16 has at least one conical surface A161 extended to the second opening A142 for guiding a medium, such as a liquid or a gas, in the first passage A14 to smoothly pass the second opening A142.

A sliding sleeve A4 and a first return spring A5 are fitted on around the front part of the core pipe A11. The sliding sleeve A4 is movable forward and rearward on along the core pipe A11 and internally has a sliding sleeve sealing section A41 slidable relative to and cooperating with the core pipe sealing section A111 to achieve the purpose of sealing. The sliding sleeve sealing section A41 is designed to close the at least one second opening A142 on the circumferential surface of the core pipe sealing section A111. Whereby, before the male coupler A is coupled to the female coupler B, the first passage A14 is always in a sealed state. The sliding sleeve A4 has a sliding sleeve sealing ring A42 fitted on around a circumferential outer surface thereof, and a rear groove A43 and a radially protruded stopper A44 are formed at a rear end thereof. The first return spring A5 is fitted on around the core pipe A11 between the sliding sleeve A4 and the seat A1 with two opposite ends thereof elastically pressing against the rear groove A43 and the seat A1.

A sleeve A2 and a male coupler housing A3 are sequentially externally fitted on around the sliding sleeve A4 and the return spring A5 from a radially inner side to a radially outer side. An inner side of the sleeve A2 and the sliding sleeve sealing ring A42 on the circumferential outer surface of the sliding sleeve A4 are contacted with one another in sealing fit, and a limiting section A21 is provided on the inner side of the sleeve A2 to interfere with and limit the protruded stopper A44 at the rear end of the sliding sleeve A4 from moving axially, lest the sliding sleeve A4 should move out of the male coupler A. The male coupler housing A3 includes a pushing and connecting section A31 for engaging with the female coupler B. And, a plug slot A6 is defined between an inner side of the male coupler housing A3 and an outer side of the sleeve A2.

Figure 6A:
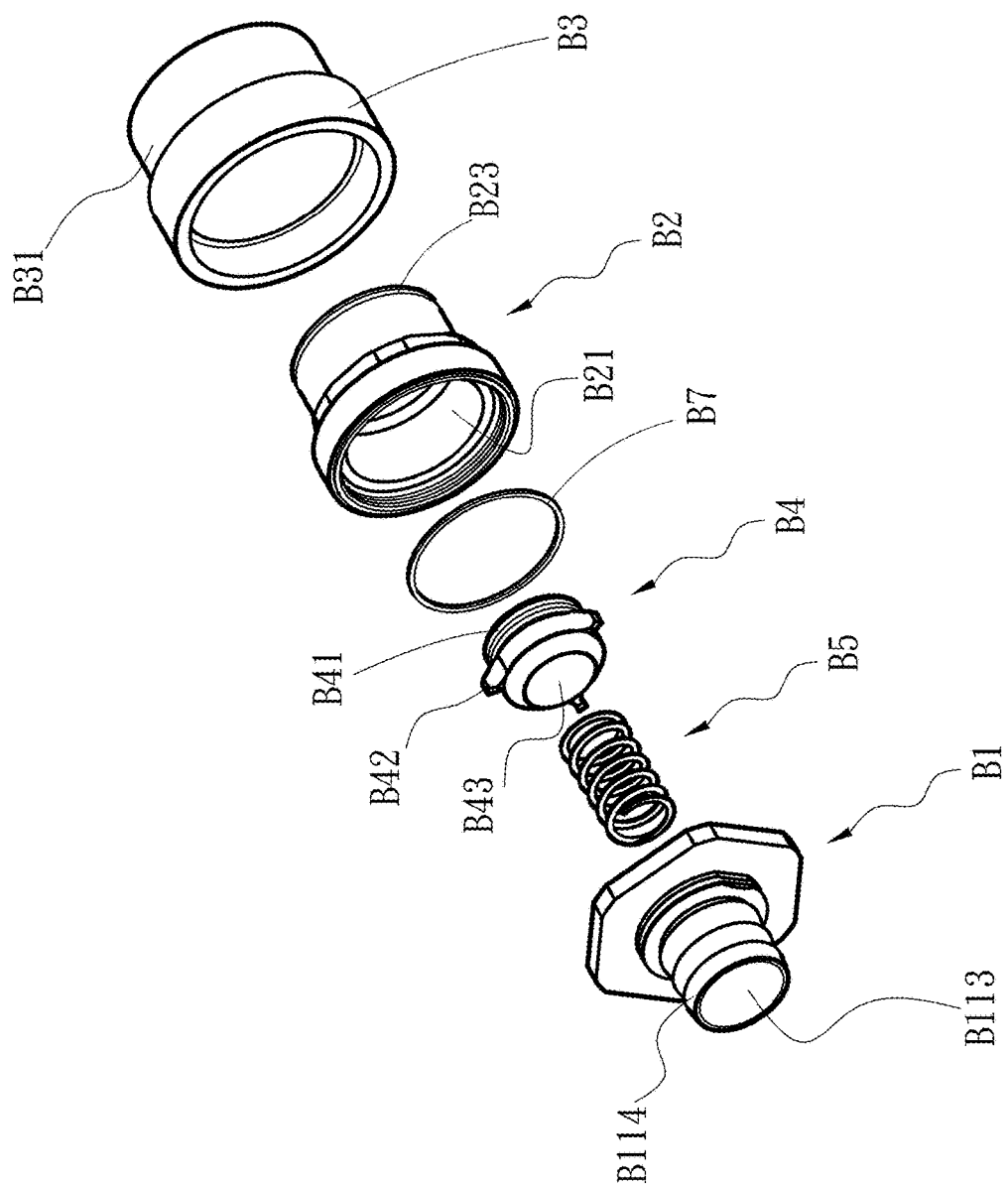
FIGS. 6A and 6B are exploded perspective views of the female coupler according to the preferred embodiment of the present invention viewed from different angles.
Figure 6B:
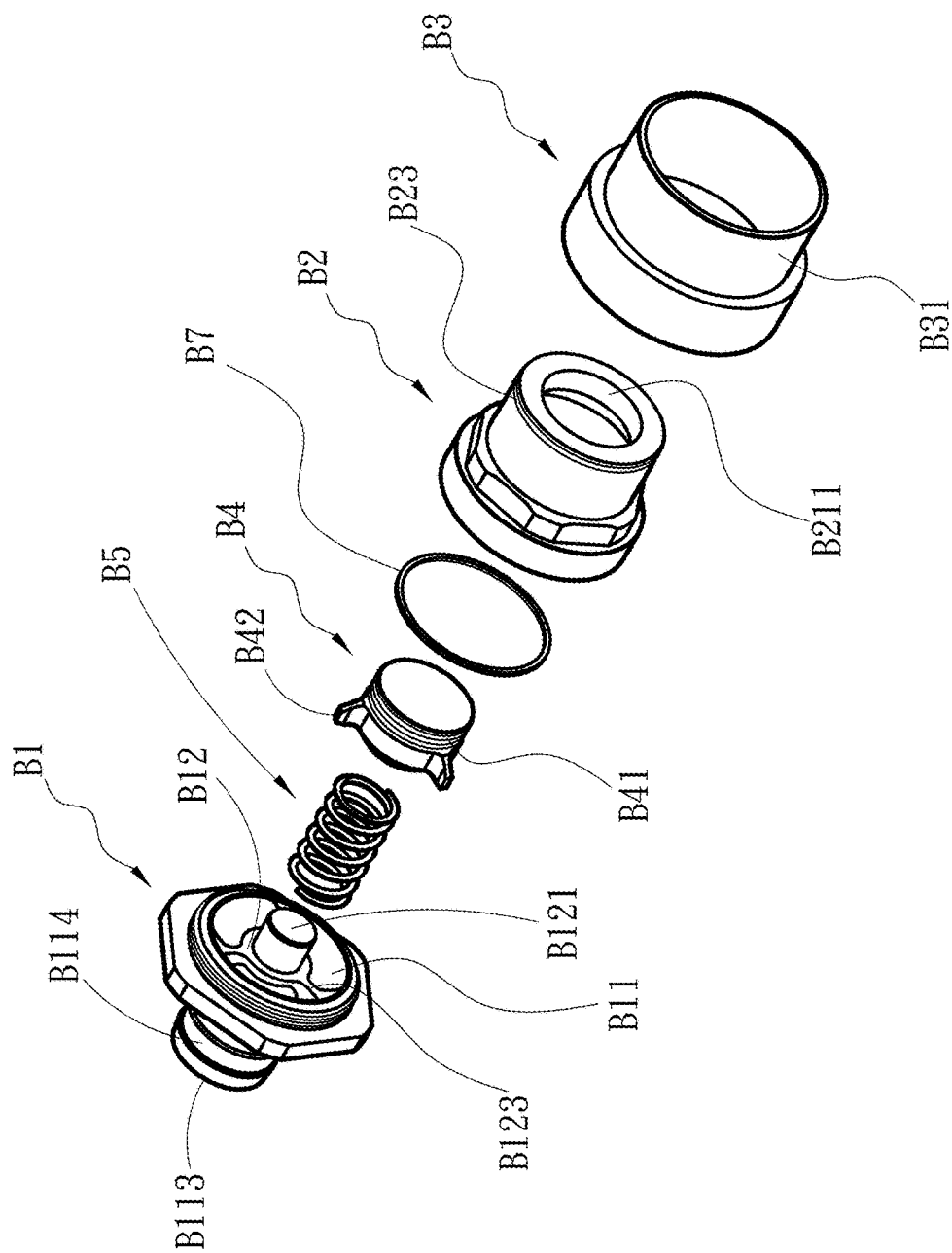
Figure 7:
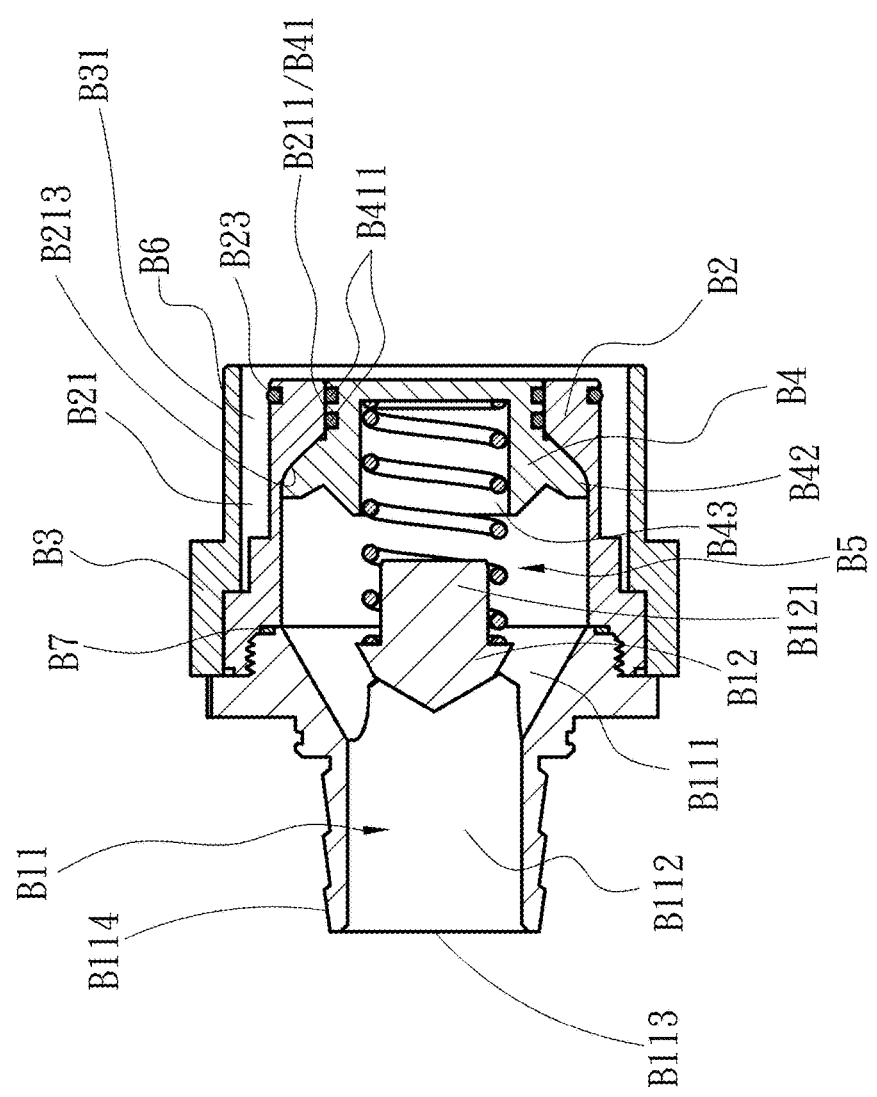
FIG. 7 is an assembled sectional side view of the female coupler of FIGS. 6A and 6B.

FIGS. 6A and 6B are two exploded perspective views of the female coupler B of the present invention viewed from different angles; and FIG. 7 is an assembled sectional side view of the female coupler B. Please refer to FIGS. 6A, 6B and 7 along with FIGS. 4 and 5. As shown, the female coupler B includes a main body B1, which has a rear end provided with a connecting section B114 for connecting with an external unit. The connecting section B114 defines a third opening B113. The main body B1 has a front end having a pipe member B2 connected thereto, and the pipe member B2 is externally covered by a female coupler housing B3.

The main body B1 internally defines a main body passage B11. A front and a rear part of the main body passage B11 internally define a rearward tapered section B111 and a rearward extending straight section B112, respectively. The tapered section B111 guides a medium, such as a liquid or a gas, to pass through the main body passage B11 smoothly and reduce the occurrence of stalling liquid or gas therein. The straight section B112 is located adjacent to the third opening B113. The main body passage B11 is internally provided with a base B12 having a forward protruded shank B121. And, the base B12 is provided on its outer surface with a plurality of spaced supporting members B123 for connecting to an inner surface of the main body passage B11, so that the base B12 is located at an axial center of the main body passage B11.

A gasket B7 is provided at a joint between the pipe member B2 and the main body B1 to prevent the medium from leaking out of the female coupler B. The pipe member B2 has a pipe sealing ring B23 mounted to an outer surface thereof near its front end for forming a seal mechanism on an inner side of the sleeve A2 when the female coupler B is coupled with the male coupler A. The pipe member B2 internally defines a second passage B21, which is communicable with the main body passage B11. The second passage B21 defines a sealing opening B211 at the front end of the pipe member B2 corresponding to the front end of the core pipe A11 of the male coupler A. And the second passage B21 is internally provided with a movable valve head B4 and a second return spring B5.

The movable valve head B4 is provided on its circumferential outer surface with at least one valve head sealing ring B411 and a plurality of spaced stabilizing wings B42. The valve head sealing ring B411 defines a valve head sealing section B41 for connecting to the sealing opening B211 in sealing fit, so that the second passage B21 is always in a sealed state before the female coupler B is coupled to the male coupler A. Radially outward extended free ends of the stabilizing wings B42 are in contact with the inner surface of the second passage B21, so that the movable valve head B4 is supported in and located at an axial center of the pipe member B2. That is, the movable valve head B4 is located at a constant radial distance from the inner surface of the second passage B21 while it can stably move forward and rearward in the second passage B21. Further, the movable valve head B4 has a valve head recess B43 formed on a rear end thereof.

The second return spring B5 has two opposite ends, one of which is fitted on around the forward protruded shank B121 of the base B12 while the other end is received in and pressed against the valve head recess B43, so that the second return spring B5 is elastically compressed between the base B12 and the movable valve head B4, allowing the movable valve head B4 to move forward and rearward in the second passage B21 without contacting with the protruded shank B121.

The female coupler housing B3 is externally fitted around the pipe member B2, and includes a plug section B31, which is located at a front end of the female coupler housing B3 and has a smaller outer diameter than that of the female coupler housing B3. The plug section B31 is correspondingly extended into the plug slot A6 when the female coupler B is coupled to the male coupler A. The female coupler housing B3 has an inner diameter larger than the outer diameter of the pipe member B2, so that a yielding space B6 is formed between the female coupler housing B3 and the pipe member B2. The sleeve A2 can be inserted into the yielding space B6 when the male coupler A is coupled to the female coupler B.

Figure 8A:
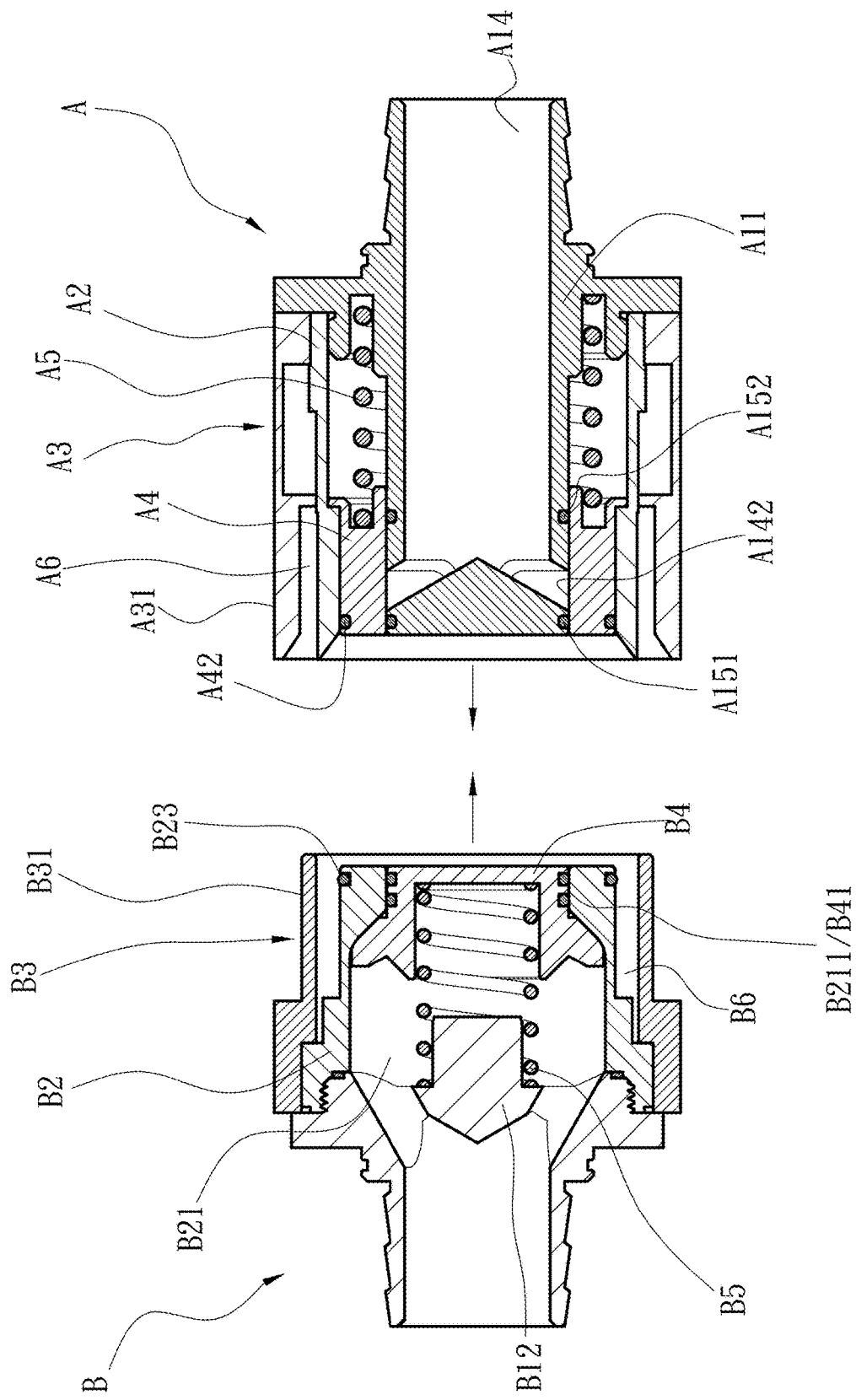
FIGS. 8A to 8E pictorially show how the male and the female coupler are communicably connected together.
Figure 8B:
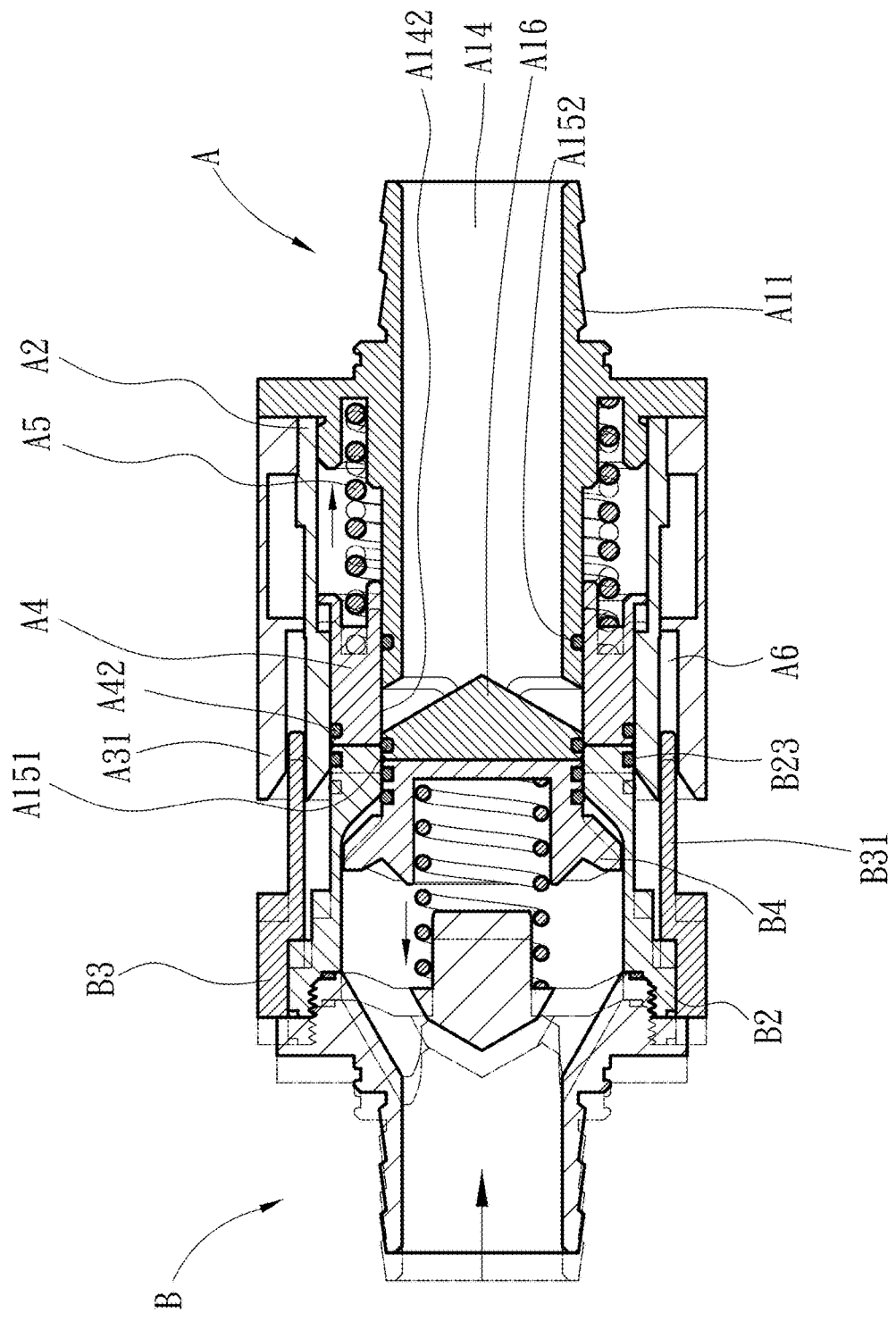
Figure 8C:
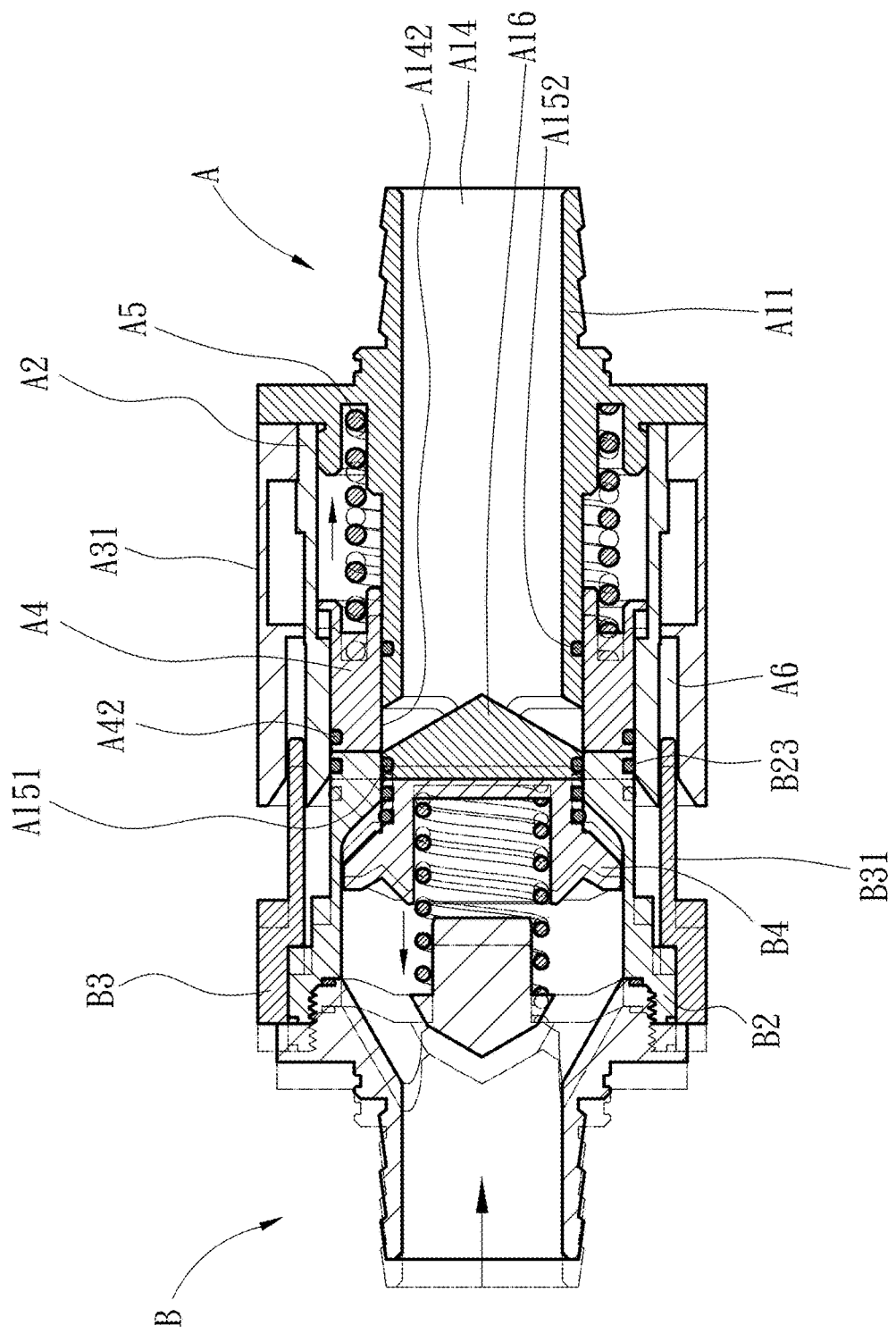
Figure 8D:
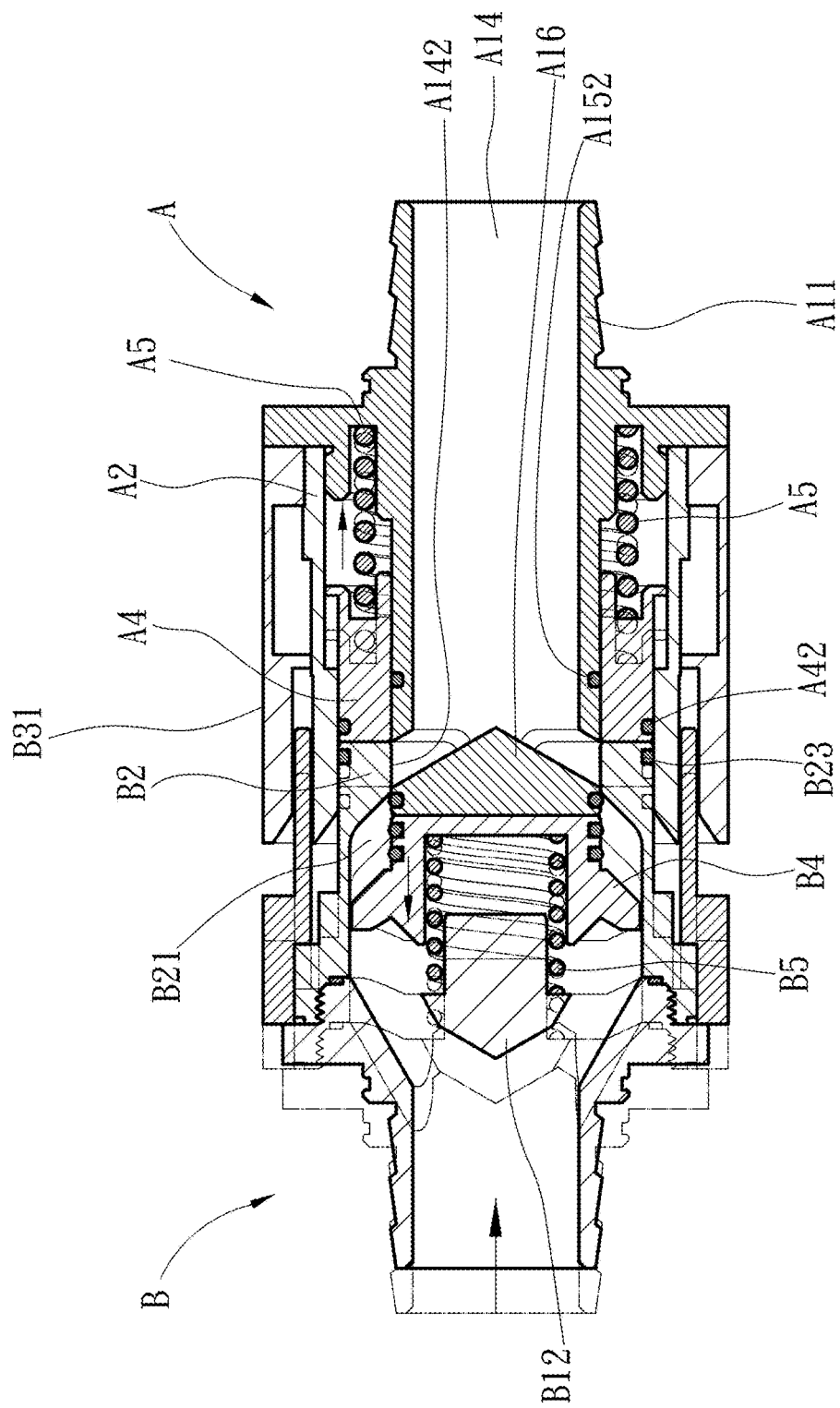

FIGS. 8A to 8E pictorially illustrate how the male and the female coupler A, B of the present invention are coupled to each other. In FIGS. 8B to 8D, phantom lines indicate the female coupler B before being coupled to the male coupler A, and solid lines indicate the female coupler B after being coupled to the male coupler A. Please refer to FIGS. 8A to 8E along with FIGS. 4, 5, 6A, 6B and 7. As shown, to couple the male coupler A and the female coupler B together, first align the male and the female coupler A, B with each other, so that they are located end to end with their front ends facing toward each other, as shown in FIG. 8A.

In the course of coupling the male and the female coupler A, B (i.e. before they are connected to each other), the plug section B31 on the female coupler housing B3 of the female coupler B is first aligned with and then correspondingly inserted into the plug slot A6 on the male coupler housing A3. At his point, the pushing and connecting section A31 on the male coupler housing A3 is fitted on an outer side of the plug section B31 of the female coupler housing B3 and the front end of the sleeve A2 of the male coupler A is inserted into the yielding space B6 on the female coupler B simultaneously. When the plug section B31 on the female coupler housing B3 of the female coupler B is inserted into the plug slot A6 on the male coupler housing A3, the front end of the pipe member B2 of the female coupler B is connected to the sleeve A2 of the male coupler A and can push the sliding sleeve A4 of the male coupler A backward, such that the first return spring A5 is elastically compressed and both the pipe sealing ring B23 on the outer surface of the pipe member B2 and the sliding sleeve sealing ring A42 on the outer surface of the sliding sleeve A4 are tightly pressed against the sleeve A2 to form an outer side first seal mechanism. Meanwhile, the front end of the core pipe A11 of the male coupler A is in contact with the front end of the movable valve head B4 to slightly push the movable valve head B4 backward. The front sealing ring A151 moves along with a front end of the front part of the core pipe A11 into the sealing opening B211 of the pipe member B2 to form an inner side second seal mechanism on the inner side of the sliding sleeve A4 before the male and the female coupler A, B are communicably connected together, as shown in FIGS. 8B and 8C.

When the front end of the pipe member B2 of the female coupler B keeps pushing against the sliding sleeve A4 of the male coupler A for the same to slide rearward, the front end of the core pipe A11 of the male coupler A enters into the pipe member B2 of the female coupler B to push the movable valve head B4 of the female coupler B backward. At this point, the rear sealing ring A152 on the core pipe A11 forms another inner side second seal mechanism on the inner surface of the sliding sleeve A4 after the male and the female coupler A, B are communicably connected together, as shown in FIG. 8D.

When a contact end surface between the front end of the pipe member B2 of the female coupler B and the front end of the sliding sleeve A4 of the male coupler A passes the second openings A142 of the male coupler A, the abovementioned first and second seal mechanisms provide multiple seals to seal a portion of the medium that seeps from the second openings A142 to the contact end surface. Therefore, the medium in the male and the female coupler A, B is prevented from leaking out before the male and the female coupler A, B are communicably connected together.

When the first and the second seal mechanism are formed, the front end of the pipe member B2 of the female coupler B keeps pushing the sliding sleeve A4 of the male coupler A rearward, and the movable valve head B4 of the female coupler B is pushed by the front end of the core pipe A11 of the male coupler A toward the base B12 of the female coupler B to eventually open the sealing opening B211, allowing the front end of the core pipe A11 of the male coupler A to enter into the second passage B21 in the pipe member B2 of the female coupler B. When the front end of the core pipe A11 of the male coupler A enters into the second passage B21 in the pipe member B2 of the female coupler B and brings the front sealing ring A151 on the core pipe A11 to pass through the sealing opening B211 and move into the second passage B21, the second openings A142 on the core pipe A11 also pass through the sealing opening B211 into the second passage B21 and become opened. In this manner, the first passage A14 of the male coupler A is communicable with the second passage B21 of the female coupler B via the second opening A142, and the medium is allowed to flow in and through the first passage A14 and the second passage B21 to complete the coupling of the male coupler A to the female coupler B, as shown in FIG. 8E.

Figure 8E:
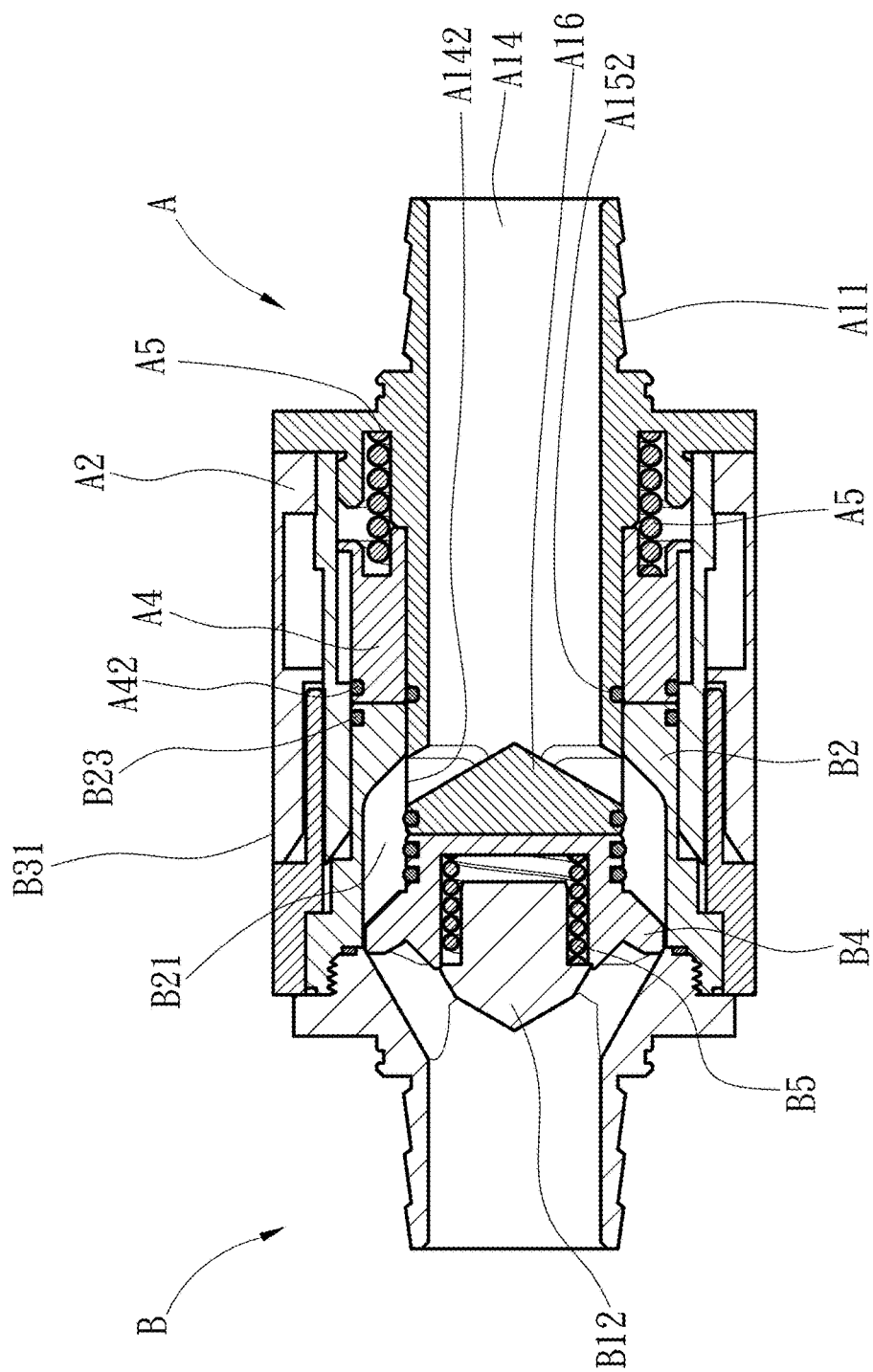

As can be seen in FIG. 8E, after the couplers A, B are fully coupled to each other, the first return spring A5 and the second return spring B5 are fully elastically compressed in the sliding sleeve A4 of the male coupler A and the movable valve head B4 of the female coupler B that have been moved to a rearmost position relative to each other. Further, the second seal mechanism on the inner surface of the sliding sleeve A4, which is formed by the rear sealing ring A152 on the core pipe A11 after the male and the female coupler A, B are fully communicably coupled together, cooperates with the first seal mechanism formed on the outer surface of the sliding sleeve A4 to provide multiple sealing and antileaking effects, so that leakage of the medium after the male coupler A and the female coupler B are completely communicably connected is avoided.

Further, a locking mechanism is provided at or outside a junction of the male and the female coupler A, B. The locking mechanism may be a customarily used or a commonly seen mechanism, which may include, for example, at least one steel ball provided on one of the male coupler A and the female coupler B and at least one recess or hole provided on the other one of the male coupler A and the female coupler B for correspondingly engaging with the steel ball. The engaged steel ball and recess or hole provides a radial locking effect to prevent the coupled couplers A and B from separating each other axially.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A quick coupler assembly, comprising:
a male coupler including a seat, a sleeve, a sliding sleeve, and a first return spring; the seat having a core pipe being externally fitted around by the sliding sleeve and the first return spring; the core pipe being provided on its circumferential outer surface with a front sealing ring and a rear sealing ring, such that a length of the core pipe located between the front and the rear sealing ring is defined as a core pipe sealing section; the core pipe internally defining a first passage, which forms a first opening at a rear end of the seat and the core pipe sealing section being provided on its circumferential surface with at least one second opening; the sliding sleeve internally including a sliding sleeve sealing section, which is slidably relative to and cooperates with the core pipe sealing section for closing the second opening and having a sliding sleeve sealing ring provided on its circumferential outer surface; and the first return spring being located between the sliding sleeve and the seat; and
a female coupler including a main body internally defining a main body passage; the main body having a rear end provided with a connecting section that defines a third opening communicable with the main body passage, and a front end having a pipe member connected thereto; the pipe member having a pipe sealing ring provided on its outer surface near the front end thereof, and being externally covered by a female coupler housing; the pipe member internally defining a second passage, which is communicable with the main body passage and forms a sealing opening at the front end of the pipe member; the second passage being internally provided with a movable valve head and a second return spring, the second return spring being located between a base of the main body of the female coupler and the movable valve head; and the movable valve head being provided on its circumferential outer surface with a valve head sealing section for connecting to the sealing opening in sealing fit; and
wherein the pipe member of the female coupler pushes the sliding sleeve of the male coupler backward when it is connected to the sleeve of the male coupler, such that the pipe sealing ring on the outer surface of the pipe member and the sliding sleeve sealing ring on the sliding sleeve together form an outer side first seal mechanism in the sleeve of the male coupler; meanwhile, the backward movement of the sleeve being pushed by the pipe member allows a front end of the core pipe of the male coupler to enter into the pipe member and push the movable valve head backward, and the front and the rear sealing ring on the seat of the male coupler respectively form an inner side second seal mechanism before and after the female and the male coupler are communicably connected together.

2. The quick coupler assembly as claimed in claim 1, wherein the first passage in the core pipe is internally provided with a conical protrusion, which is located adjacent to the front end of the core pipe and has at least one conical surface forward extended to the second opening.

3. The quick coupler assembly as claimed in claim 1, wherein the sliding sleeve is provided at a rear end with a rear groove, and the first return spring having two ends elastically pressed against the seat and the rear groove of the sliding sleeve.

4. The quick coupler assembly as claimed in claim 1, wherein the sleeve is internally provided with a limiting section and the sliding sleeve is provided at its rear end with a radially protruded stopper corresponding to the limiting section.

5. The quick coupler assembly as claimed in claim 1, wherein the main body passage includes a rearward tapered section and a straight section in front of the tapered section.

6. The quick coupler assembly as claimed in claim 1, wherein the base of the main body of the female coupler has a forward protruded shank, which is not in contact with the movable valve head; and the base being provided on it outer surface with a plurality of spaced supporting members for connecting to an inner surface of the main body passage.

7. The quick coupler assembly as claimed in claim 6, wherein the movable valve head has a front end being a valve head sealing section externally provided with at least one valve head sealing ring, and is provided on its circumferential outer surface with a plurality of spaced stabilizing wings supported on an inner side of the second passage; and the movable valve head having a rear end provided with a valve head recess.

8. The quick coupler assembly as claimed in claim 7, wherein the second return spring has two opposite ends, one of which is fitted on around the forward protruded shank while the other end is received in and elastically pressed against the valve head recess.

9. The quick coupler assembly as claimed in claim 1, wherein the female coupler includes the female coupler housing externally fitted on around the pipe member with a yielding space formed between the female coupler housing and the pipe member; and wherein the male coupler includes a male coupler housing externally fitted on around the sleeve with a plug slot defined between the male coupler housing and the sleeve.

10. The quick coupler assembly as claimed in claim 9, wherein the female coupler housing has a plug section for correspondingly inserting into the plug slot on the male coupler housing; and the sleeve of the male coupler is correspondingly inserted into the yielding space on the female coupler housing.

\* \* \* \* \*